United States Patent [19]
Nakayama et al.

[11] 3,907,641
[45] Sept. 23, 1975

[54] PROCESS FOR PRODUCING AMINO ACIDS BY FERMENTATION

[75] Inventors: Kiyoshi Nakayama, Sagamihara; Mamoru Kohata, Kawasaki; Yoshitake Tanaka, Machida; Tadaaki Nomura, Tokyo; Ryoichi Katsumata, Maebashi, all of Japan

[73] Assignee: Kyowa Hakko Kogyo Co., Ltd., Tokyo, Japan

[22] Filed: Apr. 5, 1974

[21] Appl. No.: 458,423

[30] Foreign Application Priority Data
Apr. 10, 1973 Japan.............................. 48-40043

[52] U.S. Cl. ...................... 195/49; 195/47; 195/29; 195/112
[51] Int. Cl.............................................. C12d 13/06
[58] Field of Search ........... 195/29, 49, 47, 112, 79, 195/28 R, 96

[56] References Cited
UNITED STATES PATENTS
3,663,370   5/1972   Kono et al. ............................ 195/49

OTHER PUBLICATIONS
Chem. Abstracts, 72: P 131095u.

*Primary Examiner*—Alvin E. Tanenholtz
*Assistant Examiner*—Thomas G. Wiseman
*Attorney, Agent, or Firm*—Fitzpatrick, Cella, Harper & Scinto

[57] ABSTRACT

L-lysine, L-aspartic acid, L-alanine, L-valine, L-leucine and L-arginine are produced by culturing *Protaminobacter thiaminophagus* ATCC 21927 in a nutrient medium containing methanol as the carbon source under aerobic conditions.

5 Claims, No Drawings

PROCESS FOR PRODUCING AMINO ACIDS BY FERMENTATION

BACKGROUND OF THE INVENTION

The present invention relates to a process for producing amino acids by fermentation. More particularly, it relates to a fermentative process for the production of amino acids including L-lysine, L-aspartic acid, L-alanine, L-valine, L-leucine and L-arginine by culturing a newly obtained mutant, *Protaminobacter thiaminophagus* K-217, ATCC 21927 in a nutrient medium containing methanol as a source of carbon.

Amino acids including those above-mentioned are well known to be useful in various aspects and are, therefore, in an ever increasing demand.

Various processes have been known in the art to produce amino acids by culturing either wild or mutant strains of microorganisms in a medium containing carbohydrates, hydrocarbons and organic acids as a source of carbon.

In these years, many attempts have been made on the use of alcohols such as methanol and ethanol for a fermentation raw material. Particularly, much attention has been paid on the use of methanol since methanol is not only available at a low price but also easy to handle in a fermentation procedure.

U.S. Pat. Nos. 3,707,441 and 3,708,395 suggest the use of alcohols for the fermentative production of L-lysine, but neither a practical nor concrete process is disclosed therein.

Reviewing the prior art on the practical production of amino acids from alcohols by fermentation, U.S. Pat. No. 3,595,751 discloses a production of L-lysine from ethanol by a strain of the genera *Corynebacterium, Brevibacterium, Arthrobacter, Bacillus* and *Nocardia*. U.S. Pat. No. 3,663,370 is directed to the production of L-glutamic acid from methanol by certain strains of microorganisms of the genera *Methanomonas, Protaminibacter* and *Microcyclus*. U.K. Pat. No. 1,210,770 teaches a culturing of yeasts in a medium containing methanol to produce microbial cells as well as certain amino acids. Further, Japanese Patent Publication No. 25,273/70 discloses an accumulation of amino acids by strains of the genera *Achromobacter* and *Pseudomonas* using methanol as a carbon source. However, known amino acids-producers from methanol are not satisfactory in view of either productivity or the variety of amino acids to be produced, and therefore, improved producers are still desired.

The present inventors have carried out an induction of mutation on various methanol-utilizing microorganisms to obtain such improved producers of amino acids, and as a result they have screened a mutant strain K-217 derived from *Protaminobacter thiaminophagus* ATCC 21371 which is disclosed in the above-mentioned U.S. Pat. No. 3,663,370 including its taxonomical characteristics.

The newly isolated mutant, *Protaminobacter thiaminophagus* K-217 is capable of accumulating L-lysine, L-aspartic acid, L-alanine, L-valine, L-leucine and L-arginine in a considerable amount when cultured in a medium containing methanol as a source of carbon.

*Protaminobacter thiaminophagus* K-217 has been deposited with American Type Culture Collection, Rockville, Maryland, U.S.A., accorded an accession number ATCC 21927 and is freely available therefrom to the public.

DESCRIPTION OF THE INVENTION

The present invention provides a process for producing various amino acids, i.e. L-lysine, L-aspartic acid, L-alanine, L-valine, L-leucine and L-arginine by culturing *Protaminobacter thiaminophagus* K-217 ATCC 21927 in a nutrient medium containing methanol as the main carbon source.

As the fermentation medium employed in the present process for culturing the ATCC 21927 strain, any synthetic or natural medium can be employed, so long as it contains methanol as a carbon source, nitrogen, sources, inorganic materials, vitamins and growth-promoting nutrients at proper concentrations.

Methanol to be used as a main carbon source sometimes causes the growth inhibition of microorganisms when present at a high concentration in the medium. Generally, it is desirable that the concentration of methanol in the medium be maintained below about 3%(v/v). Good results can be obtained when a medium initially having a low concentration, for example, 0.5 – 3%(v/v) of methanol is used and culturing is carried out while feeding methanol to the medium continuously, in an amount of 0.3 – 0.6%(v/v) based on the volume of the medium per hour, or intermittently in an amount of 0.5 – 2%(v/v) based on the volume of the medium at each feeding, as methanol is consumed by the microorganism.

As the nitrogen source, ammonium salts such as ammonium chloride, ammonium sulfate, ammonium phosphate and ammonium nitrate, ammonia and urea may be used. Casamino acid, peptone and yeast extract may also be used as the nitrogen source. These natural organic substances contain vitamins and other growth-promoting substances and, therefore, are effective to reduce culturing time and promote production of L-lysine when supplemented in small amounts to the medium as the nitrogen source. Additionally, as inorganic materials, potassium phosphates, magnesium sulfate, iron and manganese salts may be used. The strain of the present invention, i.e. *Protaminobacter thiaminophagus* K-217, ATCC 21927 has the requirement for thiamine. Therefore, thiamine or a natural product containing thiamine must be added to the medium.

Culturing is carried out under aerobic conditions at 20° to 40°C for 2 to 5 days. In order to obtain a high yield of the product, it is desirable that the pH of the medium be maintained at 4 to 9, preferably, at around neutral during culturing. The pH may be adjusted with calcium carbonate, various buffer solutions or alkaline solutions.

After the completion of culturing, the microbial cells are removed from the culture broth by filtration. The produced amino acids are recovered from the resulting filtrate by any of the well known methods, such as ion exchange resin treatment, crystalization by concentration, etc.

The following example is presented for illustrating the present invention.

EXAMPLE 1

In this example, *Protaminobacter thiaminophagus* K-217 (FERM-P No. 2021) ATCC 21927 is used. This strain is inoculated in 10 ml of a seed medium having the following composition in a test tube and cultured at 30°C for 20 hours with shaking.

| | |
|---|---|
| Methanol | 20 ml |
| $(NH_4)_2SO_4$ | 6 g |
| $KH_2PO_4$ | 2 g |
| $K_2HPO_4$ | 7 g |
| $MgSO_4.7H_2O$ | 0.5 g |
| $FeSO_4.7H_2O$ | 10 mg |
| $MnSO_4.4H_2O$ | 8 mg |
| Thiamine hydrochloride | 1 mg |
| Biotin | 10 μg |
| Yeast extract | 0.1 g |
| Phenol red (pH-indicator) | 10 mg |
| Water to make up the total volume (pH: 7.2) | 1 l |

The resulting seed culture is inoculated into 10 ml portions of a fermentation medium having the same composition as the seed medium in test tubes in a ratio of 1 ml. Culturing is carried out at 30°C for 96 hours with shaking. 24 hours, 48 hours and 72 hours after the start of the culturing, 2% of methanol is added to each culture broth (total amount of the added methanol: 6%). The pH of the culture broth is adjusted about neutrality using 14% aqueous ammonia. After the completion of culturing, 0.2 mg/ml of L-aspartic acid, 0.8 mg/ml of L-alanine, 1.0 mg/ml of L-valine, 1.2 mg/ml of L-leucine, 0.7 mg/ml of L-arginine and 0.3 mg/ml of L-lysine (as L-lysine hydrochloride) are accumulated in the culture broth.

After the removal of the microbial cells by filtration, the L-aspartic acid, L-alanine, L-valine, L-leucine, L-arginine and L-lysine are recovered by a conventional ion exchange treatment. The yield of L-aspartic acid, L-alanine, L-valine, L-leucine, L-arginine and L-lysine from one liter of the culture is 0.14 g, 0.48 g, 0.6 g, 0.72 g, 0.49 g and 0.21 g, respectively.

What is claimed is:

1. A process for producing L-lysine, L-aspartic acid, L-alanine, L-valine, L-leucine and L-arginine which comprises culturing *protaminobacter thiaminophagus* ATCC 21927 in a nutrient medium containing methanol as the carbon source under aerobic conditions, accumulating L-lysine, L-aspartic acid, L-alanine, L-valine, L-leucine and L-arginine in the medium and isolating at least one of said amino acids.

2. A process of claim 1, wherein said culturing is carried out at 20° to 40°C.

3. A process according to claim 1 wherein said culturing is carried out at about neutral pH.

4. A process according to claim 1 wherein said methanol is fed to said culture medium continuously in an amount of 0.3 to 0.6% by volume based upon the volume of the culture medium during said culturing step.

5. A process according to claim 1 wherein said methanol is fed to said culture medium intermittently in an amount of 0.5 to 2% by volume based upon the volume of said culture medium during said culturing step.

\* \* \* \* \*